US012517462B2

(12) United States Patent
Kahrobaiyan et al.

(10) Patent No.: US 12,517,462 B2
(45) Date of Patent: Jan. 6, 2026

(54) FLEXIBLE GUIDE ASSEMBLY FOR A ROTATING RESONATOR MECHANISM, PARTICULARLY FOR A TIMEPIECE MOVEMENT

(71) Applicant: The Swatch Group Research and Development Ltd, Marin (CH)

(72) Inventors: Mohammad Hussein Kahrobaiyan, Neuchâtel (CH); Gianni Di Domenico, Neuchâtel (CH)

(73) Assignee: The Swatch Group Research and Development Ltd, Marin (CH)

( * ) Notice: Subject to any disclaimer, the term of this patent is extended or adjusted under 35 U.S.C. 154(b) by 993 days.

(21) Appl. No.: 17/527,558

(22) Filed: Nov. 16, 2021

(65) Prior Publication Data

US 2022/0171337 A1 Jun. 2, 2022

(30) Foreign Application Priority Data

Dec. 2, 2020 (EP) ..................................... 20211343

(51) Int. Cl.
*G04B 17/32* (2006.01)
*G04B 17/04* (2006.01)

(52) U.S. Cl.
CPC ............. *G04B 17/32* (2013.01); *G04B 17/04* (2013.01)

(58) Field of Classification Search
CPC ................................ G04B 17/04; G04B 17/32
See application file for complete search history.

(56) References Cited

U.S. PATENT DOCUMENTS

| | | | | |
|---|---|---|---|---|
| 10,216,146 | B2 * | 2/2019 | Chabloz | G04B 13/00 |
| 2016/0179058 | A1 * | 6/2016 | Born | G04C 3/008 368/167 |
| 2017/0010586 | A1 * | 1/2017 | Di Domenico | G04B 17/045 |
| 2019/0064742 | A1 * | 2/2019 | Di Domenico | G04B 17/28 |
| 2019/0079454 | A1 | 3/2019 | Semon et al. | |

FOREIGN PATENT DOCUMENTS

| | | |
|---|---|---|
| CN | 101620406 A | 1/2010 |
| CN | 107957671 A | 4/2018 |

(Continued)

OTHER PUBLICATIONS

Combined Chinese Office Action and Search Report issued Jun. 17, 2024, in corresponding Chinese Patent Application No. 202111461895.5 (with English Translation of Category of Cited Documents), 10 pages.

(Continued)

*Primary Examiner* — Edwin A. Leon
*Assistant Examiner* — Jason M Collins
(74) *Attorney, Agent, or Firm* — Oblon, McClelland, Maier & Neustadt, L.L.P.

(57) ABSTRACT

A flexible guide assembly for a rotating resonator mechanism, the assembly including a fixed support and two flexible guides extending in substantially the same plane or in two different parallel planes, the first flexible guide including a first element movable with respect to the fixed support, a first pair of flexible strips connected to the first movable element, such that the first movable element can move by bending the strips of the first pair in a circular motion about a first centre of rotation, the second flexible guide includes a second element movable with respect to first movable element, a second pair of flexible strips connecting the second movable element to the first movable element, such that the second movable element can move with respect to the first movable element by bending the strips of the second pair in a circular motion about a second (Continued)

centre of rotation. The first centre of rotation and the second centre of rotation are offset by a first predefined distance belonging to a plane of the assembly.

19 Claims, 5 Drawing Sheets

(56) References Cited

FOREIGN PATENT DOCUMENTS

| | | | |
|---|---|---|---|
| CN | 109307998 | A | 2/2019 |
| CN | 111324028 | A | 6/2020 |
| EP | 3 035 126 | A1 | 6/2016 |
| EP | 3 430 478 | A1 | 1/2019 |
| EP | 3 435 172 | A2 | 1/2019 |
| EP | 3 430 478 | B1 | 7/2020 |
| JP | 2016-118548 | A | 6/2016 |
| WO | WO 2017/157868 | A1 | 9/2017 |

OTHER PUBLICATIONS

European Search Report issued Apr. 30, 2021 in European Application 20211343.7, filed on Dec. 2, 2020, 3 pages (with English Translation of Categories of cited documents).

Notice of the Reason for Refusal issued Nov. 1, 2022 in Japanese Patent Application No. 2021-195158 (with English language translation), 12 pages.

* cited by examiner

FLEXIBLE GUIDE ASSEMBLY FOR A ROTATING RESONATOR MECHANISM, PARTICULARLY FOR A TIMEPIECE MOVEMENT

CROSS-REFERENCE TO RELATED APPLICATION

This application claims priority to European Patent Application No. 20211343.7 filed on Dec. 2, 2020, the entire disclosure of which is hereby incorporated herein by reference.

FIELD OF THE INVENTION

The present invention concerns a flexible guide assembly for a rotating resonator mechanism. The invention also relates to a timepiece movement provided with such a flexible guide assembly.

BACKGROUND OF THE INVENTION

Most current mechanical watches are provided with a balance/balance spring and a Swiss lever escapement. The balance/balance spring forms the time base of the watch. It is also called a resonator.

The escapement, on the other hand, performs two main functions:

- maintaining the back-and-forth motions of the resonator;
- counting these back-and-forth motions.

The Swiss lever escapement has low energy efficiency (around 30%). This low efficiency is due to the fact that the movements of the escapement are jerky, there are 'drops' or runs to the banking to accommodate machining errors, and also because several components transmit their motion via inclined faces which rub against one another.

Making a mechanical resonator requires an inertia element, a guide member and an elastic return element. Conventionally, a balance spring acts as the elastic return element for the inertia element formed by a balance. The balance is guided in rotation by pivots which rotate in smooth ruby bearings. This gives rise to friction, and therefore to energy losses and disturbances in operation, which are position-dependent and which it is sought to eliminate.

There are also known embodiments of resonators comprising guides with flexible strips as the elastic return means for the inertia element(s). Flexible guides with a virtual pivot can substantially improve the efficiency of timepiece resonators. The simplest are guides having crossed strips, consisting of two straight, generally perpendicular strips that are crossed. However, there are also guides with uncrossed strips of the RCC type (Remote Centre Compliance), which have straight strips that are not crossed. Such a resonator is described in EP Patent No. 2911012, or in EP Patent Nos. 14199039 and 16155039.

The use of a flexible guide makes it possible replace the pivot of a balance as well as its balance spring. This has the advantage of eliminating pivot friction and thereby increasing the quality factor of the resonator. However, flexible guides are known to have a small angular travel (on the order of 10° to 20°, compared to the 300° of a balance spring). The large angular travel is required to ensure the proper operation of many mechanical escapements.

To answer this problem, it has been envisaged to place in series several guides having flexible strips, for example in US Patent No. 2018319517, US Patent No. 2019120287 or EP Patent No. 3451072. Thus, a much greater angular travel is obtained. The advantage of placing several guides in series is that each guide has a small amplitude of rotation, which makes it possible to obtain good isochronism and good guidance.

However, some drawbacks remain, particularly the lack of control of unwanted motions of the guide or the effect of gravity on the flexible guide, which remains significant.

SUMMARY OF THE INVENTION

Consequently, it is an object of the invention to propose a flexible guide for a rotating resonator mechanism, which avoids the aforementioned problems.

To this end, the invention concerns a flexible guide assembly for a rotating resonator mechanism, particularly for a timepiece movement, the assembly comprising a fixed support and two flexible guides extending in substantially the same plane or in two different parallel planes, the two flexible guides being arranged in series, the first flexible guide comprising a first element movable with respect to the fixed support, a first pair of flexible strips connected to the first movable element, such that the first movable element can move by bending the strips of the first pair in a circular motion about a first centre of rotation, the second flexible guide comprising a second element movable with respect to the first movable element and to the fixed support, a second pair of flexible strips connecting the second movable element to the first movable element, such that the second movable element can move with respect to the first movable element and the fixed support by bending the strips of the second pair in a circular motion about a second centre of rotation.

The flexible guide assembly is characterized in that the first centre of rotation and the second centre of rotation are offset by a first predefined distance belonging to a plane of the assembly.

As a result of the invention there is obtained an assembly of guides with flexible strips having a sufficient angular travel, more precise control of unwanted motions, and minimization of the effect of gravity on the operation of the resonator.

Indeed, by adjusting the offset between the flexible guides, unwanted motions of the flexible guide assembly can be chosen to make them easier to control. Further, this offset minimises the effect of gravity since the flexible guides do not have the same arrangement.

According to an advantageous embodiment, the strips of the first pair of strips are crossed.

According to an advantageous embodiment, the strips of the first pair of strips are not crossed.

According to an advantageous embodiment, the strips of the second pair of strips are crossed.

According to an advantageous embodiment, the strips of the second pair of strips are not crossed.

According to an advantageous embodiment, the assembly comprises a third flexible guide arranged in series downstream of the second flexible guide, the third flexible guide comprising a third movable element and a third pair of flexible strips connecting the third movable element to the second movable element, such that the third movable element can move with respect to the second movable element, the first movable element and the fixed support, by bending the strips of the third pair in a circular motion about a third centre of rotation.

According to an advantageous embodiment, the third centre of rotation is offset with respect to the second centre of rotation by a second predefined distance belonging to a plane of the assembly.

According to an advantageous embodiment, the strips of the third pair of strips are crossed.

According to an advantageous embodiment, the strips of the third pair of strips are not crossed.

According to an advantageous embodiment, the assembly comprises a fourth flexible guide arranged in series, the fourth flexible guide comprising a fourth movable element and a fourth pair of flexible strips connecting the fourth movable element to the third movable element or to the support, such that the fourth movable element can move with respect to the third movable element, the second movable element, the first movable element and the support, by bending the strips of the fourth pair of strips in a circular motion about a fourth centre of rotation.

According to an advantageous embodiment, the fourth centre of rotation is offset with respect to the third centre of rotation by a third predefined distance belonging to a plane of the assembly.

According to an advantageous embodiment, the strips of the fourth pair of strips are crossed.

According to an advantageous embodiment, the strips of the fourth pair of strips are not crossed.

According to an advantageous embodiment, the assembly is symmetrical with respect to a longitudinal line and/or with respect to a transverse line in a rest position of the assembly.

According to an advantageous embodiment, the first pair of flexible strips is connected to the fixed support.

According to an advantageous embodiment, the centres of rotation of the flexible guides are arranged on a straight line in the rest position of the assembly, the centre of mass of the resonator being preferably also arranged on said straight line.

According to an advantageous embodiment, the rigidity of each flexible guide is chosen according to the following equation:

$$\sum_{i=2}^{N+1} r_i\left(1 + k_1\sum_{j=3}^{i}\frac{1}{k_{j-1}}\right)^n = 0$$

for every value of n belonging to the set of values $\{1, \ldots, N-1\}$, where N is the number of flexible guides, $k_j$ and $k_i$ being the rigidity of guide i and of guide j, and $r_i$ being the offset between the centres of rotation of flexible guide i and of flexible guide i−1.

According to an advantageous embodiment, the flexible guides are identical and follow the following equation:

$$\sum_{i=2}^{N+1} r_i(i-1)^n = 0$$

for every value of n belonging to the set of values $\{1, \ldots, N-1\}$, where N is the number of flexible guides and $r_{N+1}$ is the distance between the last centre of rotation of the last flexible guide and the centre of mass (M).

According to an advantageous embodiment, the flexible guides follow the following equation:

$$\frac{r_{k+1}}{r_1} = (-1)^k\binom{N}{k}$$

where k=0, 1, . . . , N, N being the number of flexible guides. The value of the number k is chosen as a function of the number of pivots and following the rule of Pascal's triangle.

The invention also relates to a rotating resonator mechanism for a timepiece movement, the mechanism comprising an oscillating weight and a flexible guide assembly according to the invention.

BRIEF DESCRIPTION OF THE DRAWINGS

Other features and advantages of the present invention will appear upon reading the description of several embodiments given purely by way of non-limiting examples, with reference to the annexed drawings, in which.

DETAILED DESCRIPTION OF PREFERRED EMBODIMENTS

Figure 1:
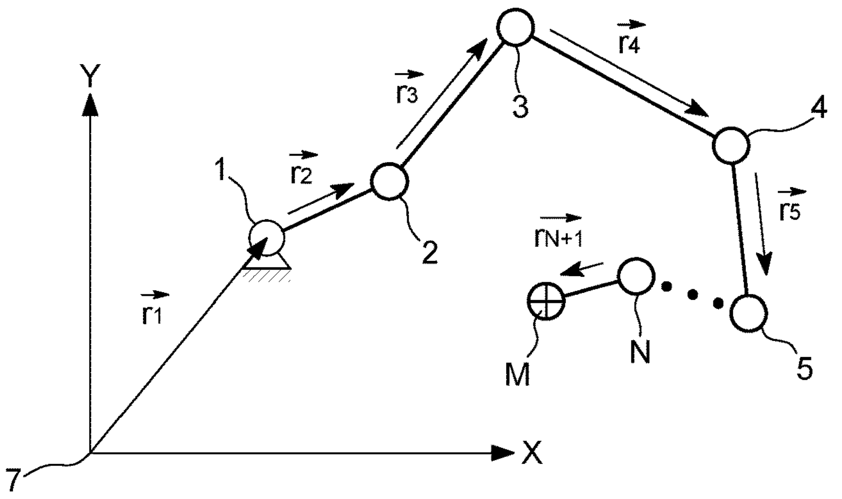
FIG. 1 schematically represents a first arrangement of flexible guides of a flexible guide assembly according to the invention.

FIG. 1 represents a theoretical arrangement of a plurality of centres of rotation of flexible guides, each flexible guide having a centre of rotation 1, 2, 3, 4, 5, . . . N about which it rotates. The flexible guides are arranged in series in different positions, such that the centres of rotation 1, 2, 3, 4, 5, . . . N of each flexible guide are offset from each other in the rest position of the assembly. The rest position corresponds to an absence of motion of the flexible guides, the guides all being in a position of equilibrium. In other words, none of the centres of rotation has an identical position to another centre of rotation. Each centre of rotation has a defined position relative to the centre of rotation of the preceding flexible guide in the series, except the first flexible guide 1, which is determined relative to the origin of a reference mark. Each centre of rotation of a flexible guide is offset with respect to the centre of rotation of the preceding flexible guide. Thus, the centre of rotation of second flexible guide 2 is offset by a distance $\vec{r}_2$ with respect to the centre of rotation of first flexible guide 1, and the centre of rotation of third flexible guide 3 is offset by a distance $\vec{r}_3$ with respect to the centre of rotation of second flexible guide 2, and so on until the last flexible guide N. Depending on the arrangement of the flexible guides, the assembly has a centre of mass M arranged at a distance $\overrightarrow{r_{N+1}}$ from the centre of rotation of the last flexible guide N. In the Figure, all the centres of rotation are offset with respect to one another, but in various embodiments, some centres of rotation can be superposed.

Figure 2:
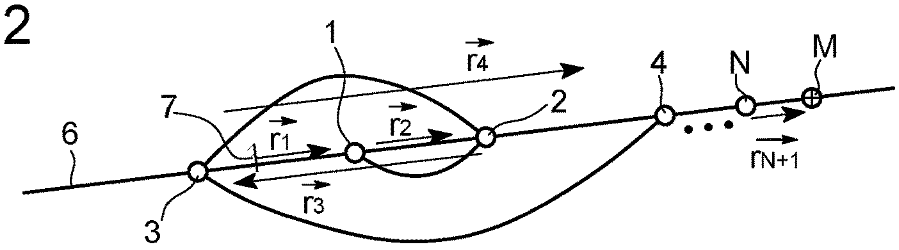
FIG. 2 schematically represents a second arrangement of flexible guides of a flexible guide assembly according to the invention, FIG. 3 schematically represents a third embodiment of flexible guides of a flexible guide assembly according to the invention, FIG. 4 schematically represents a flexible guide assembly according to a first embodiment, FIG. 5 schematically represents a flexible guide assembly according to a second embodiment of the invention, FIG. 6 schematically represents a flexible guide assembly according to a third embodiment of the invention, FIG. 7 schematically represents a flexible guide assembly according to a fourth embodiment of the invention, FIG. 8 schematically represents a flexible guide assembly according to a fifth embodiment of the invention, FIG. 9 schematically represents a flexible guide assembly according to a sixth embodiment of the invention, FIG. 10 schematically represents a flexible guide assembly according to a seventh embodiment of the invention, FIG. 11 schematically represents a flexible guide assembly according to an eighth embodiment of the invention, FIG. 12 schematically represents a flexible guide assembly according to a ninth embodiment of the invention, FIG. 13 schematically represents a flexible guide assembly according to a tenth embodiment of the invention, and FIG. 14 schematically represents a flexible guide assembly according to an eleventh embodiment of the invention.

Two pivots are said to be in series when they are assembled to one another such that the movable element of the following pivot is movable in rotation via means connected to the movable element of the preceding pivot. Preferably, the flexible guides are arranged such that the centres of rotation of all the flexible guides are arranged on the same straight line 6, as shown in FIG. 2. Thus, centres of rotation 1, 2, 3, 4, 5, . . . N of each flexible guide are offset with respect to one another by a predefined distance on the same line. This arrangement of the guides of the assembly makes it possible to reduce the effect of gravity on the assembly. Indeed, the movement of the centre of gravity is less than the general case of FIG. 1.

In one particular case, the flexible guides are arranged according to the following equation:

$$\sum_{i=2}^{N+1} r_i \left(1 + k_1 \sum_{j=3}^{i} \frac{1}{k_{j-1}}\right)^n = 0$$

where n=1, . . . , N−1, N being the number of flexible guides belonging to the assembly, $k_j$ being the rigidity of guide j, and $r_i$ being the distance of the offset between the centres of rotation of flexible guide i and of flexible guide i−1.

The distance $r_1$ is the distance between the centre of rotation of guide 1 and a fixed support 7 of the assembly. This arrangement of the guides of the assembly further reduces the effect of gravity on the assembly, since the movement of the centre of gravity is even smaller.

In a particular case where all the flexible guides are identical with the same rigidity k, the equation becomes:

$$\sum_{i=2}^{N+1} r_i (i-1)^n = 0$$

where n=1, . . . , N−1, N being the number of flexible guides belonging to the assembly, and $r_{N+1}$ is the distance between the last centre of rotation of the last flexible guide and the centre of mass (M). This arrangement of the guides of the assembly reduces the manufacturing cost of the assembly, since the guides are identical and therefore easier to manufacture.

In a variant, the guides are identical with different rigidityes, or they are different with identical rigidityes. In these cases, flexible guides are chosen according to the following binomial equation:

$$\frac{r_{k+1}}{r_1} = (-1)^k \binom{N}{k}$$

where k=0, 1, . . . , N, N being the number of flexible guides, $r_{k+1}$ being the distance of the offset between the centres of rotation of flexible guide k+1 and of flexible guide k. The value of the number k is chosen as a function of the number of guides and following the rule of Pascal's triangle. The Pascal triangle has the following form:

$$\begin{array}{c} 1 \\ 1\ \ -1 \\ 1\ \ -2\ \ 1 \\ 1\ \ -3\ \ 3\ \ -1 \\ 1\ \ -4\ \ 6\ \ -4\ \ 1 \\ 1\ \ -5\ \ 10\ \ -5\ \ 1 \\ \ldots \end{array}$$

With an assembly of two flexible guides, the coefficients k of the third line are selected. For an assembly of three guides, the coefficients k of the fourth line are selected. For an assembly of four guides, the coefficients k of the fifth line are selected, and so on for the additional guides. The last number corresponds to the offset of the centre of mass of the assembly. When a coefficient has a negative sign, the offset is in the opposite direction on line 6 relative to the offsets whose coefficient k is positive.

Figure 3:
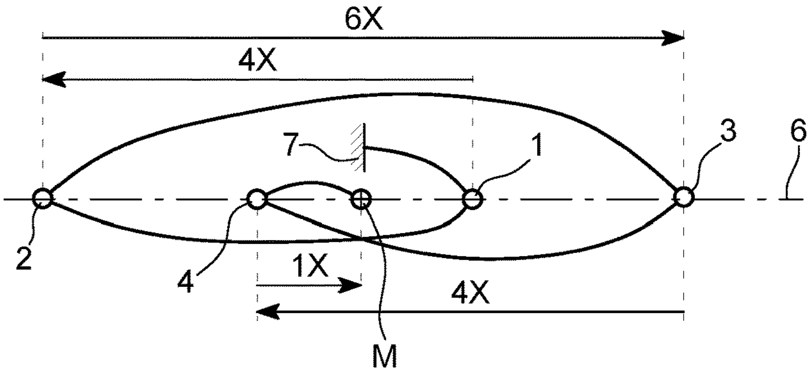

For example, in FIG. 3, for an assembly of four flexible guides, the first centre of rotation 1 of the first guide is arranged at a distance X from support 7 with coefficient 1 on line 6. The second centre of rotation 2 of the second guide is offset by a distance −4X from first centre of rotation 1 on line 6. The third centre of rotation 3 of the third guide is offset by a distance 6X from second centre of rotation 2 on line 6. The fourth centre of rotation 4 of the fourth guide is offset by a distance −4X from third centre of rotation 3 on line 6. Finally, the assembly is configured such that the centre of mass M of the assembly is arranged at a distance X from fourth centre of rotation 4 on line 6.

This arrangement of the guides of the assembly further reduces the effect of gravity on the assembly, since the movement of the centre of gravity is smaller than the preceding variant.

The embodiments of the assemblies of FIGS. 4 to 14 comprise flexible guides whose centres of rotation are arranged on the same line.

Figure 4:
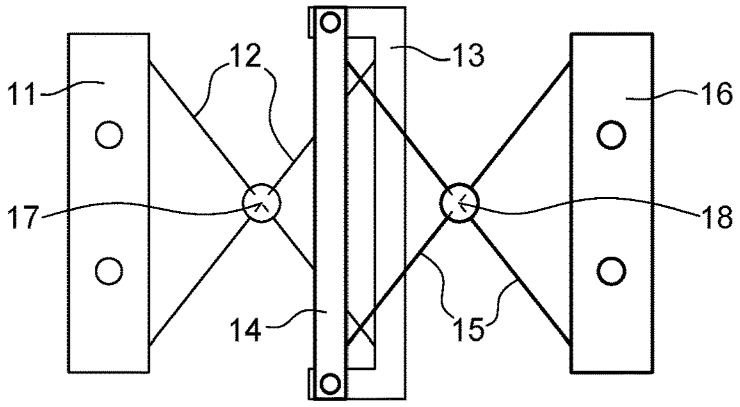
Figure 5:
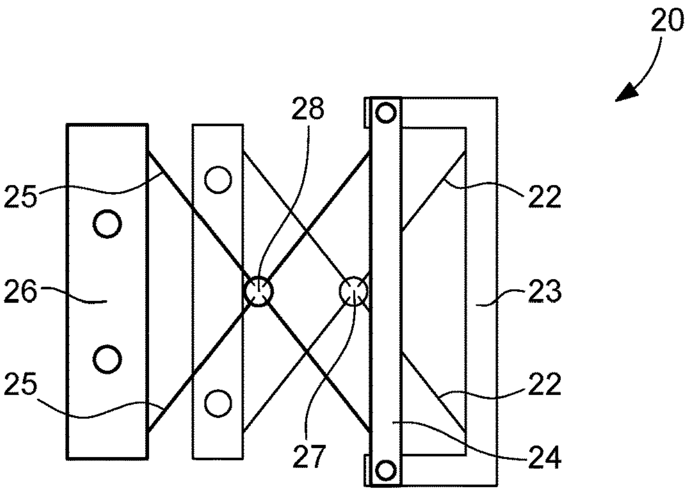

FIGS. 4 and 5 show a first embodiment 10 and a second embodiment 20 of an assembly of two flexible guides assembled in series. Assembly 10, 20 comprises a support 11, 21 and two flexible guides each arranged substantially in one plane. Support 11, 21 has the shape of an elongated rectangular plate arranged laterally with respect to assembly 10, 20.

The first flexible guide comprises a first element 13, 23 movable with respect to support 11, 21 and a first pair of flexible strips 12, 22 connecting support 11, 21 to first movable element 13, 23. Thus, first movable element 13, 23 can move with respect to support 11, 21 by bending the strips of first pair 12, 22 in a circular motion about a first centre of rotation 17, 27. First movable element 13, 23 has a tubular shape describing a rectangle, a long side 14, 24 of the rectangle being raised relative to the other sides so that it is in the plane of the second flexible guide. The rectangle is arranged laterally, substantially parallel to support 11, 21 in the rest position of the assembly.

The second flexible guide comprises a second element 16, 26 movable with respect to first movable element 13, 23 and a second pair of flexible strips 15, 25 connecting the second movable element 16, 26 to first movable element 13, 23. Thus, second movable element 16, 26 can move with respect to first movable element 13, 23 by bending the strips of the second pair 15, 25 in a circular motion about a second centre of rotation 18, 28. Second movable element 16, 26 has the shape of an elongated rectangular plate arranged laterally, substantially parallel to support 11, 21 and to first movable element 13, 23 in the rest position of assembly 10, 20.

Flexible strips 12, 15, 22, 25 of a same pair are crossed and are welded at their crossing point. The strips of a same pair are joined to support 11, 21 or to movable element 13, 16, 26, 23 on the same side. The strips of the second pair 15, 25 are joined on the same raised side 14, 24 of the first movable element 13, 23.

In the first embodiment of assembly 10 of FIG. 4, the two flexible guides extend one after the other, while in the second embodiment of assembly 20 of FIG. 5, the two flexible guides are mostly superposed, the second flexible guide being oriented in the other direction above the first guide with respect to the first embodiment 10.

According to the invention, the first centre of rotation 17, 27 and the second centre of rotation 18, 28 are offset by a first predefined distance for the two embodiments. The centres of rotation are arranged substantially at the crossing point of the pairs of strips 12, 15, 22, 25 of each flexible guide in the rest position of assembly 10, 20. In first embodiment 10, the distance is greater than in second embodiment 20.

Figure 6:
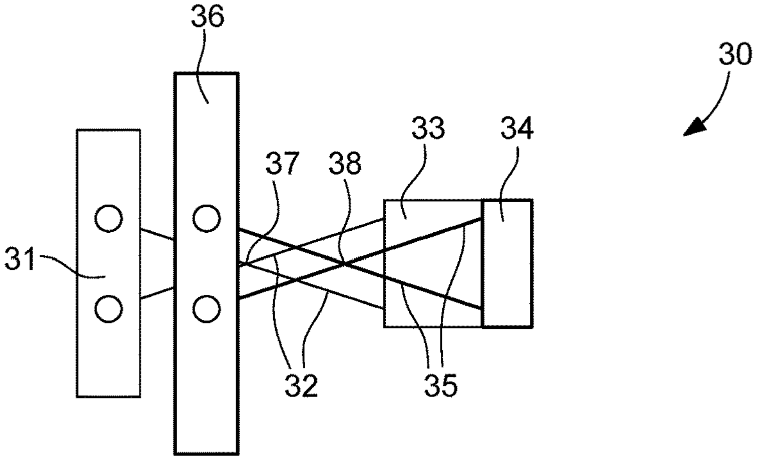

The third embodiment of FIG. 6 is a variant of the second embodiment, wherein the two pairs of crossed strips 32, 35 are not joined at their crossing point. Furthermore, the first movable element 33 has a rectangular shape provided with a raised portion 34 so that it is in the plane of the second flexible guide. The two guides are mainly superposed, with an offset to separate the two centres of rotation 37, 38 by a first predefined distance. Support 31 and second movable element 36 of assembly 30 are almost superposed.

Figure 7:
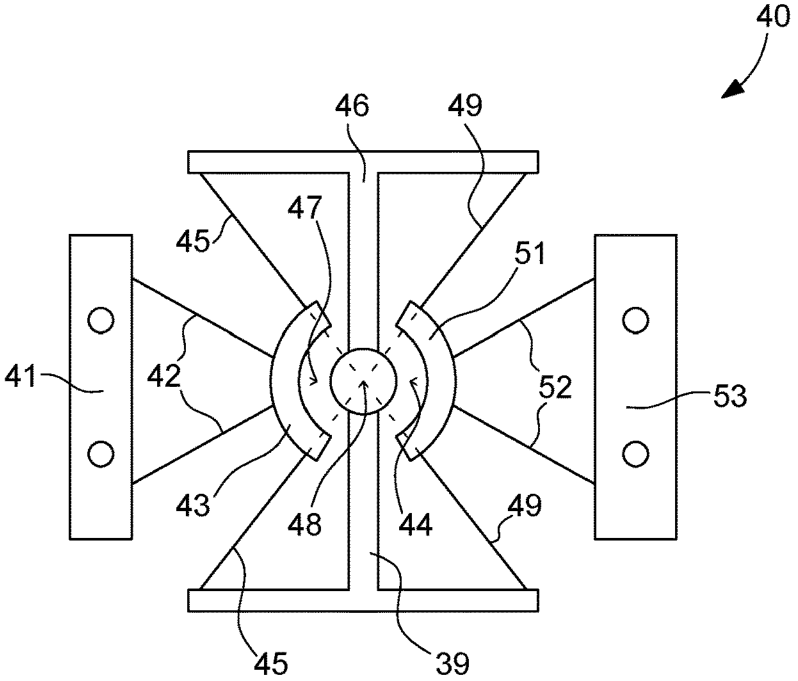

FIG. 7 shows a fourth embodiment of an assembly 40 comprising a support 41 and four flexible guides arranged in series. The guides are arranged in substantially the same plane. Support 41 has the shape of an elongated rectangular plate arranged laterally with respect to assembly 40.

The first flexible guide comprises a first element 43 movable with respect to support 41, a first pair 42 of flexible strips connecting support 41 to first movable element 43. Thus, first movable element 43 can move with respect to support 41 by bending the strips of first pair 42 in a circular motion about a first centre of rotation 47. First movable element 43 is in the shape of an arc of a circle, the curvature of which is oriented towards support 41.

The second flexible guide comprises a second element 46 movable with respect to first movable element 43, and a second pair 45 of flexible guides connecting second movable element 46 to first movable element 43. Thus, second movable element 46 can move with respect to first movable element 43 by bending the strips of the second pair 45 in a circular motion about a second centre of rotation 48. The second movable element 46 has the shape of an H, the central section 39 of which is elongated.

According to the invention, the first centre of rotation 47 and the second centre of rotation 48 are offset by a first predefined distance. Centres of rotation 47, 48 are arranged substantially at the crossing point of a collinear line of the strips of each flexible guide in the rest position.

Assembly 40 comprises a third flexible guide arranged in series downstream of the second flexible guide. The third flexible guide comprises a third movable element 51, and a third pair of flexible strips 49 connecting third movable element 51 to second movable element 46. Thus, third movable element 51 can move with respect to second movable element 46 by bending the strips of the third pair 49 in a circular motion about a third centre of rotation. The third centre of rotation is in substantially the same place as second centre of rotation 48. Third movable element 51 is in the shape of an arc of a circle arranged symmetrically to the other arc of a circle of first movable element 43 with respect to section 39 of the H-shaped body which is in the middle of assembly 40. The two arcs are arranged in the H, on either side of section 39.

The assembly comprises a fourth flexible guide arranged in series downstream of the third flexible guide, the fourth flexible guide comprising a fourth movable element 53 and a fourth pair 52 of flexible strips connecting fourth movable element 53 to third movable element 51. Thus, fourth movable element 53 can move with respect to third movable element 51 by bending the strips of the fourth pair 52 in a circular motion about a fourth centre of rotation 44. Fourth centre of rotation 44 is offset with respect to the second and third centre of rotation 48 by a second predefined distance, which is substantially equal to the first distance. Fourth movable element 53 has the shape of an elongated rectangular plate arranged parallel to support 41 in the rest position of assembly 40. The curvature of the arc of third movable element 51 is oriented towards fourth movable element 53. Support 41 and fourth movable element 53 are arranged on the outside of the H behind each arc.

The four flexible guides have strips that are not crossed. The strips of a same pair 42, 45, 49, 52 of strips are arranged on the same side of support 41 and/or of the corresponding movable element 43, 46, 51, 53. Two flexible guides are arranged symmetrically in pairs. Thus, flexible guide assembly 40 is symmetrical with respect to a longitudinal line and a transverse line in the rest position, the two lines being substantially perpendicular.

Figure 8:
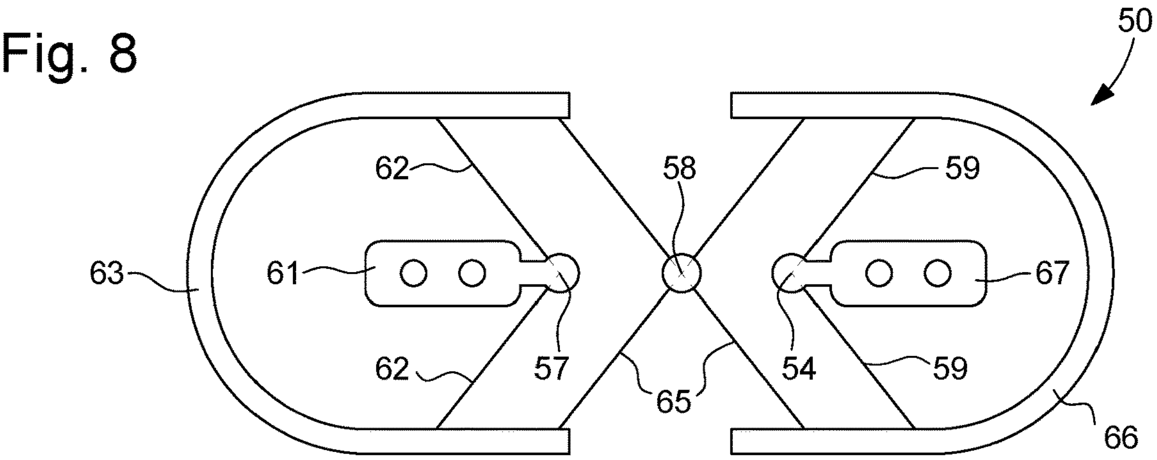

In the fifth embodiment of FIG. 8, an assembly 50 comprises a support 61 and three flexible guides arranged in series, each guide being arranged substantially in the same plane. Support 61 has the shape of an elongated rectangular plate provided with a protuberance on which the strips are joined.

The first flexible guide comprises a first element 63 movable with respect to support 61, a first pair of flexible strips 62 connecting support 61 to first movable element 63. Thus, first movable element 63 can move with respect to support 61 by bending the strips of first pair 62 in a circular motion about a first centre of rotation 57. First movable element 63 is U-shaped.

The second flexible guide includes a second element 66 movable with respect to first movable element 63, and a second pair of flexible strips 65 connecting second movable element 66 to first movable element 63. Thus, second movable element 66 can move with respect to first movable element 63 by bending the strips of the second pair 65 in a circular motion about a second centre of rotation 58. The second movable element 66 is U-shaped.

The assembly comprises a third flexible guide arranged in series downstream of the second flexible guide. The third flexible guide comprises a third element 67 movable with respect to second movable element 66, and a third pair of flexible strips 59 connecting third movable element 67 to second movable element 66. Thus, third movable element 67 can move with respect to second movable element 66 by bending the strips of the third pair 59 in a circular motion about a third centre of rotation 54. Third movable element 67 has the shape of an elongated rectangular plate provided with a protuberance on which the strips are joined. Third centre of rotation 54 is offset with respect to second centre of rotation 58 by a second predefined distance substantially equal to the first distance.

The first and third flexible guides have flexible strips that are not crossed. The second flexible guide has crossed flexible strips, the strips being joined at their crossing point. The two U shapes face each other, such that the inside of one U faces the other. The two U shapes are joined to each other by the second pair of strips 65 forming an 'X', the ends of the strips being assembled to the inside of the U shapes. Support 61 and third movable element 67 are each arranged inside the U, the protuberances being directed towards the outside of the U. The first pair 62 and third pair 59 of strips are joined to the inside of the U after the strips of second pair 58.

The flexible guide assembly is symmetrical with respect to a longitudinal line and with respect to a transverse line in the rest position, the two lines being substantially perpendicular.

Figure 9:
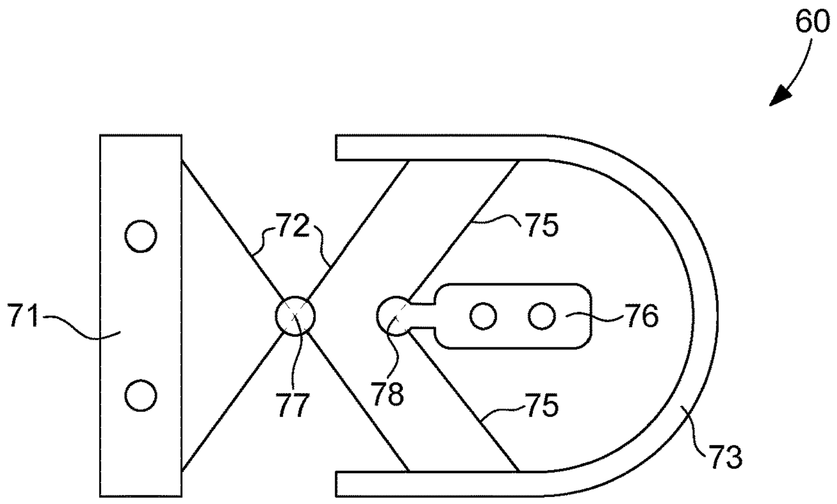

The sixth embodiment of FIG. 9 shows an assembly 60 comprising a support 71 and two flexible guides arranged in series in one plane. Support 71 has the shape of an elongated rectangular plate arranged laterally with respect to assembly 60.

The first flexible guide comprises a first element 73 movable with respect to support 71, a first pair of flexible strips 72 connecting support 71 to first movable element 73. Thus, first movable element 73 can move with respect to support 71 by bending the strips of first pair 72 in a circular motion about a first centre of rotation 77. First movable element 73 is U-shaped with the inside of the U facing the support laterally.

The second flexible guide comprises a second element 76 movable with respect to first movable element 73, and a second pair of flexible strips 75 connecting second movable element 76 to first movable element 76. Thus, second movable element 76 can move with respect to first movable element 73 by bending the strips of the second pair 75 in a circular motion about a second centre of rotation 78. Second movable element 76 has the shape of an elongated rectangular plate provided with a protuberance on which the strips are joined.

According to the invention, the first centre of rotation 77 and the second centre of rotation 78 are offset by a first predefined distance. Centres of rotation 77, 78 are arranged substantially at the crossing point of a collinear line of the strips of each flexible guide in the rest position. Thus, the first centre of rotation 77 is formed at the crossing point, while the second centre of rotation is formed at the protuberance of second movable element 76.

The first flexible guide has crossed flexible strips, the strips being joined at their crossing point. The second flexible guide has flexible strips that are not crossed.

The support and the U are joined to each other by the second pair of strips 75 forming an X, the ends of the strips being assembled to the inside of the U shapes on the one hand and to the side of the rectangular plate on the other. Second movable element 76 is arranged inside the U, the protuberance facing the outside of the U. The first and second pairs of strips 72, 75 are joined to the inside of the U.

Figure 10:
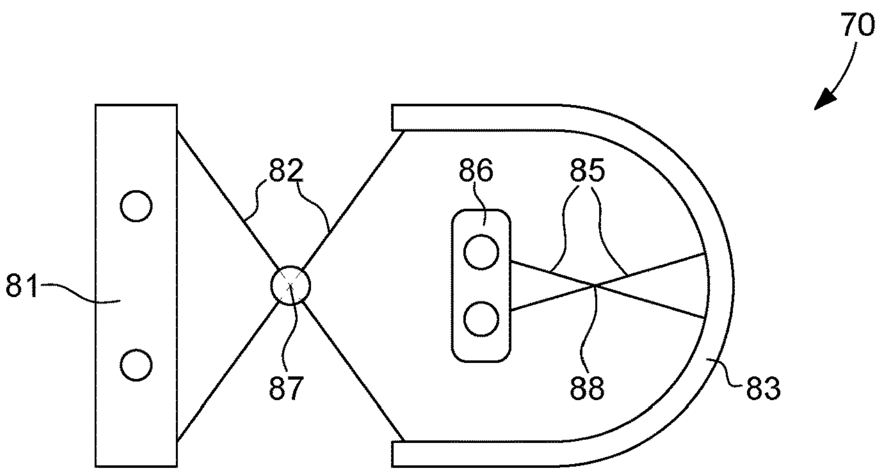

In the seventh embodiment of FIG. 10, assembly 70 is a variant of the fifth embodiment of FIG. 9, wherein the flexible strips of the second pair 85 are crossed, the second movable element 85 being arranged perpendicularly to support 81 inside the U of the first movable element 83. The first centre of rotation 87 of first pair of strips 82 is offset with respect to second centre of rotation 88.

Figure 11:
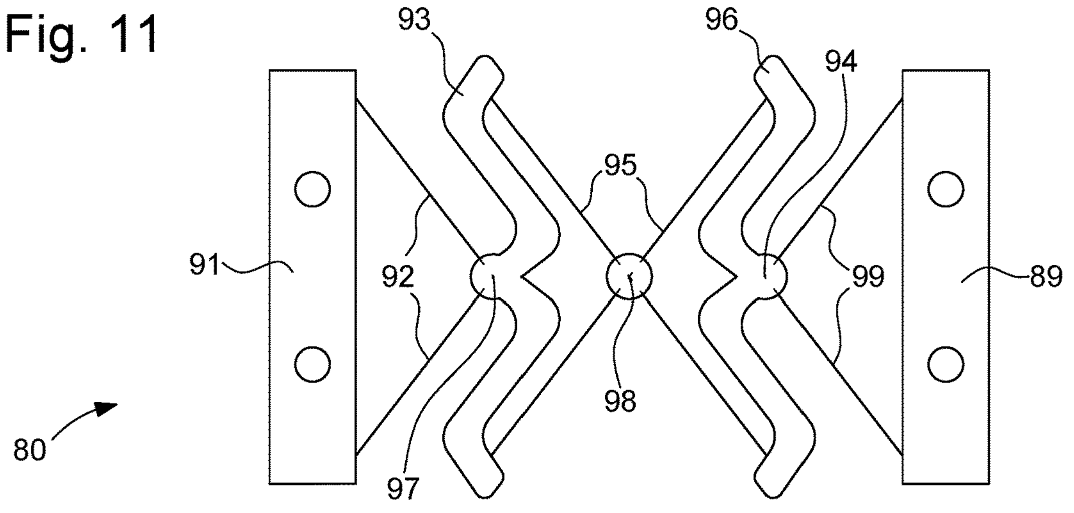

In FIG. 11, the eighth embodiment of an assembly 80 comprises a support 91 and three flexible guides arranged in series in substantially the same plane. Support 91 has the shape of an elongated rectangular plate arranged laterally with respect to assembly 80.

The first flexible guide comprises a first element 93 movable with respect to support 91, a first pair of flexible strips 92 connecting support 91 to first movable element 93. Thus, first movable element 93 can move with respect to support 91 by bending the strips of first pair 92 in a circular motion about a first centre of rotation 97. First movable element 93 has the shape of a W with curved ends.

The second flexible guide includes a second element 96 movable with respect to first movable element 93, and a second pair of flexible strips 95 connecting second movable element 96 to first movable element 93. Thus, second movable element 96 can move with respect to first movable element 93 by bending the strips of the second pair 95 in a circular motion about a second centre of rotation 98. The second movable element 96 is also W-shaped with curved ends, the W being arranged substantially parallel to first movable element 93 in the inverted position.

The bottom of the W shapes face each other. The two W shapes are joined to one another by the second pair 95 of strips forming an X, the ends of the strips being assembled to the curved ends of the W shapes. The first and third pairs of strips are joined on the inner tip of the W.

The assembly comprises a third flexible guide arranged in series downstream of the second flexible guide. The third flexible guide comprises a third element 89 movable with respect to second movable element 96, and a third pair of flexible strips 99 connecting third movable element 89 to second movable element 96. Thus, third movable element 89 can move with respect to second movable element 96 by bending the strips of the third pair 99 in a circular motion about a third centre of rotation 94. Third movable element 89 has the shape of an elongated rectangular plate arranged substantially parallel to first movable element 93 and to the W shapes.

The first and the third flexible guides have pairs 92, 99 of flexible strips that are not crossed. The second flexible guide has a pair of crossed flexible strips 95, the strips being joined at their crossing point. The strips of a same pair of strips are arranged on the same side of the support and/or of the movable element. The strips of the second pair of strips 95 are joined to the curved ends of each W.

According to the invention, the first centre of rotation 97 and the second centre of rotation 98 are offset by a first predefined distance. The third centre of rotation 94 is also offset with respect to second centre of rotation 98 by a second predefined distance. Centres of rotation 97, 98 are arranged substantially at the crossing point of a collinear line of the strips of each pair 92, 95, 99 of each flexible guide in the rest position. Thus, the second centre of rotation 97 is formed at the crossing point, while the first 98 and the third 94 centre of rotation is formed at the inner tip of the W shapes.

Flexible guide assembly 80 is symmetrical with respect to a longitudinal line and with respect to a transverse line in the rest position, the two lines being substantially perpendicular.

Figure 12:
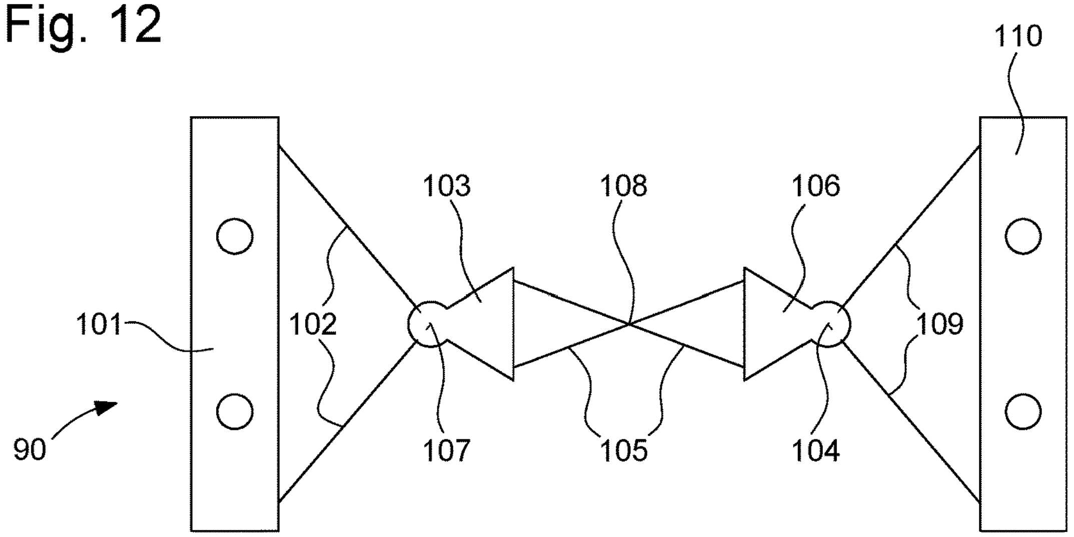
Figure 13:
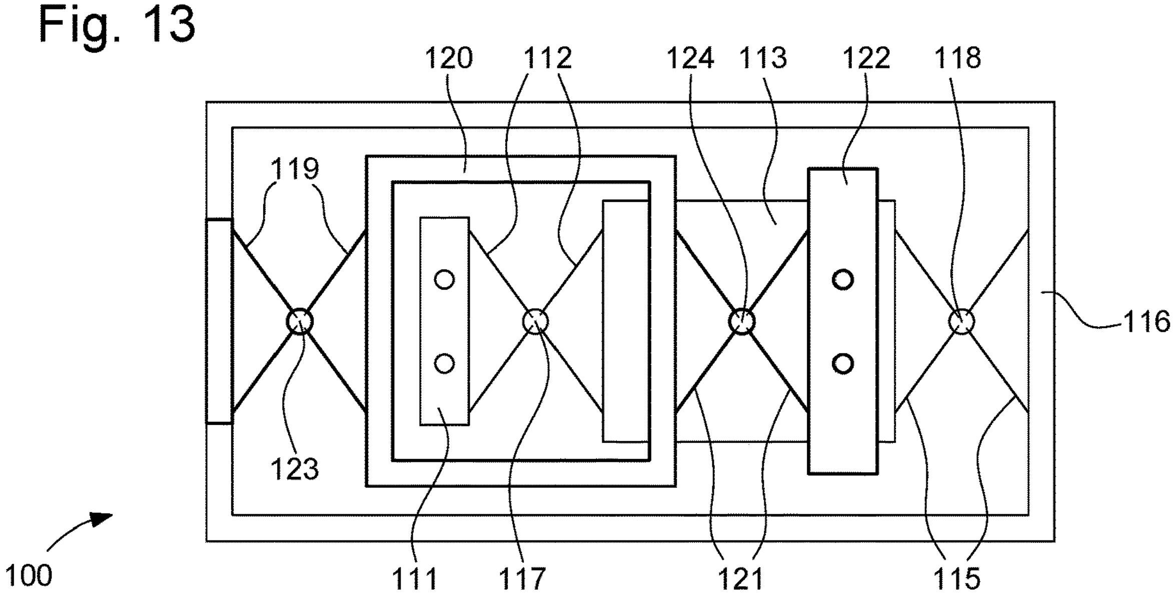

In the ninth embodiment of FIG. 12, assembly 90 comprises a support 101 and three flexible guides arranged in series in substantially the same plane. Support 101 has the shape of an elongated rectangular plate arranged laterally with respect to assembly 90.

The first flexible guide comprises a first element 103 movable with respect to support 101, a first pair of flexible strips 103 connecting support 101 to first movable element 103. Thus, first movable element 103 can move with respect to support 101 by bending the strips of first pair 102 in a circular motion about a first centre of rotation 107. First movable element 103 has the shape of a triangle, one vertex of which has a rounded protuberance.

The second flexible guide includes a second element 106 movable with respect to first movable element 103, and a second pair of flexible strips 105 connecting second movable element 106 to first movable element 103. Thus, second movable element 106 can move with respect to first movable element 103 by bending the strips of the second pair 105 in a circular motion about a second centre of rotation 108. Second movable element 103 has the shape of a triangle, one vertex of which has a rounded protuberance. The function of the protuberances is to catch the uncrossed strips.

Assembly 90 comprises a third flexible guide arranged in series downstream of the second flexible guide. The third flexible guide comprises a third element 110 movable with respect to second movable element 106, and a third pair of flexible strips 109 connecting third movable element 110 to second movable element 106. Thus, third movable element 110 can move with respect to second movable element 106 by bending the strips of the third pair 109 in a circular motion about a third centre of rotation 104. Third movable element 110 has the shape of an elongated rectangular plate arranged substantially parallel to support 101.

The strips of a same pair of strips are arranged on the same side of the support and/or of the movable element. The flexible strips of first pair 102 and third pair 109 of flexible strips are not crossed. The flexible strips of second pair 102 of flexible strips are crossed.

The two triangles are arranged between support 101 and third movable element 110, the protuberances facing second movable element 103 and third movable element 106. First pair 102 and third pair 109 of strips are joined to the protuberances, while the strips of second pair 105 are joined to the base of the triangles.

Flexible guide assembly 90 is symmetrical with respect to a longitudinal line and with respect to a transverse line in the rest position, the two lines being substantially perpendicular.

According to the invention, the first centre of rotation 107 and the second centre of rotation 108 are offset by a first predefined distance. The centres of rotation are arranged substantially at the crossing point of a collinear line of the strips of each pair 102, 105, 109 of each flexible guide in the rest position. Further, the third centre of rotation 104 is also offset with respect to second centre of rotation 98 by a second predefined distance.

Figure 14:
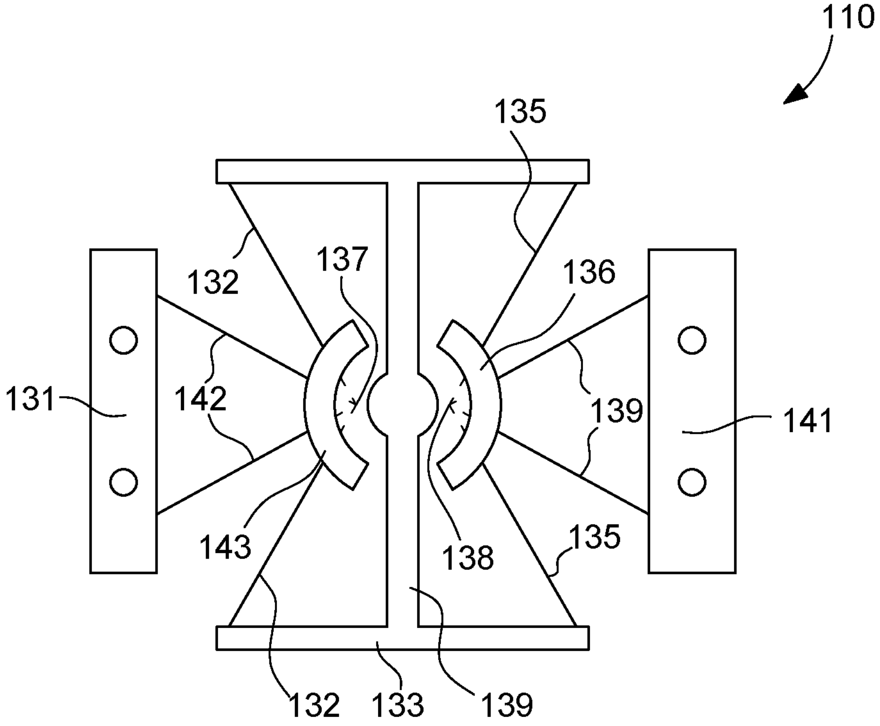

In FIG. 14, the tenth embodiment of an assembly 100 according to the invention comprises a support 111 and four flexible guides arranged in series. The first and second guide are arranged in a first plane, while the third and fourth guide are arranged in a second plane substantially parallel to the first. The support has the shape of an elongated rectangular plate arranged laterally with respect to guide 100.

The first flexible guide comprises a first element 113 movable with respect to support 111, and a first pair of flexible strips 112 connecting support 111 to first movable element 113. Thus, first movable element 113 can move with respect to support 111 by bending the strips of first pair 112 in a circular motion about a first centre of rotation 117. First movable element 113 has the shape of a substantially square plate.

The second flexible guide includes a second element 116 movable with respect to first movable element 113, and a second pair of flexible strips 115 connecting second movable element 116 to first movable element 113. Thus, second movable element 116 can move with respect to first movable element 113 by bending the strips of the second pair 115 in a circular motion about a second centre of rotation 118. Second movable element 116 has a tubular structure in the form of a rectangle delimiting the length and the width of assembly 100 in the rest position of assembly 100.

Assembly 100 comprises a third flexible guide arranged in series downstream of the second flexible guide. The third flexible guide comprises a third element 120 movable with respect to second movable element 116, and a third pair of flexible strips 119 connecting third movable element 120 to second movable element 116. Thus, third movable element 120 can move with respect to second movable element 116 by bending the strips of the third pair 119 in a circular motion about a third centre of rotation 123. Third movable element 120 has a tubular structure in the form of a square whose dimensions are smaller than the rectangle of second movable element 116.

The assembly comprises a fourth flexible guide arranged in series downstream of the third flexible guide, the fourth flexible guide comprising a fourth movable element 122 and a fourth pair of flexible strips 121 connecting fourth movable element 122 to third movable element 120. Thus, fourth movable element 122 can move with respect to third movable element 120 by bending the strips of the fourth pair 121 in a circular motion about a fourth centre of rotation 124. Fourth movable element 122 has the shape of an elongated rectangular plate arranged laterally with respect to support 100 in the rest position of assembly 100.

According to the invention, the first centre of rotation 117 and the second centre of rotation 118 are offset by a first predefined distance in the first plane. Third centre of rotation 123 is offset with respect to second centre of rotation 118 by a second predefined distance in the second plane. Fourth centre of rotation 124 is offset with respect to third centre of rotation 123 by a third predefined distance in the second plane. Centres of rotation 117, 118, 123, 124 are arranged substantially at the crossing point of a collinear line of the strips of each pair of flexible strips in the rest position of assembly 100.

The strips of a same pair of strips are arranged on the same side of the support and/or of the movable element. Two flexible guides are arranged symmetrically in pairs. Thus, flexible guide assembly 100 is symmetrical with respect to a longitudinal line and a transverse line in the rest position, the two lines being substantially perpendicular.

The invention also relates to a rotating timepiece resonator mechanism, not represented in the Figures. The resonator mechanism is provided with an oscillating weight and a flexible guide assembly such as one of the embodiments described above. The oscillating weight is, for example, an annular-shaped balance or a bone-shaped member, which is assembled on the last movable element in series of the assembly.

FIG. 14 shows a fourth embodiment of an assembly 110 comprising a support 131 and four flexible guides arranged in series. The guides are arranged in substantially the same plane. Support 131 has the shape of an elongated rectangular plate arranged laterally with respect to assembly 110.

The first flexible guide comprises a first element 133 movable with respect to support 131, a first pair 132 of flexible strips connected to first movable element 133. Thus, first movable element 133 can move by bending the strips of first pair 132 in a circular motion about a first centre of rotation 137. First movable element 113 has the shape of an H, the central section 139 of which is elongated.

The second flexible guide comprises a second element 136 movable with respect to first movable element 133, and a second pair 135 of flexible strips connecting second movable element 136 to first movable element 133. Thus, second movable element 136 can move with respect to first movable element 133 by bending the strips of the second pair 135 in a circular motion about a second centre of rotation 138. Second movable element 136 is in the shape of an arc of a circle, the curvature of which does not face support 131.

According to the invention, the first centre of rotation 137 and the second centre of rotation 138 are offset by a first predefined distance. Centres of rotation 137, 138 are arranged substantially at the crossing point of a collinear line of the strips of each flexible guide in the rest position.

Assembly 110 comprises a third flexible guide arranged in series downstream of the second flexible guide. The third flexible guide comprises a third movable element 141, and a third pair of flexible strips 139 connecting third movable element 141 to second movable element 136. Thus, third movable element 141 can move with respect to second movable element 136 by bending the strips of the third pair 139 in a circular motion about a third centre of rotation. The third centre of rotation is in substantially the same place as second centre of rotation 138. Third movable element 141 has the shape of an elongated rectangular plate arranged parallel to support 131 in the rest position of assembly 40. The curvature of the arc of second movable element 136 is oriented towards third movable element 141. Support 131 and third movable element 141 are arranged on the outside of the H behind each arc.

The assembly comprises a fourth flexible guide arranged in series upstream of the first flexible guide, the fourth flexible guide comprising a fourth movable element 143 and a fourth pair 142 of flexible strips connecting fourth movable element 143 to support 131. Thus, fourth movable element 143 can move with respect to support 131 by bending the strips of fourth pair 142 in a circular motion about a fourth centre of rotation. The fourth centre of rotation is in substantially the same place as first centre of rotation 137. The strips of the first pair of strips 132 connect fourth movable element 143 to first movable element 133, to allow first movable element 133 to move with respect to fourth movable element 143 by bending the strips of the first pair of strips 132 in a circular motion about first centre of rotation 137. Fourth movable element 143 is in the shape of an arc of a circle, the curvature of which is oriented towards support 131. Fourth movable element 143 is arranged symmetrically to the other arc of a circle of second movable element 136 with respect to section 139 of the H-shaped body which is in the middle of assembly 110. The two arcs are arranged in the H, on either side of section 139.

The four flexible guides have strips that are not crossed. The strips of a same pair 132, 135, 139, 142 of strips are arranged on the same side of support 131 and/or of the corresponding movable element 133, 136, 141, 143. Two flexible guides are arranged symmetrically in pairs. Thus, flexible guide assembly 110 is symmetrical with respect to a longitudinal line and a transverse line in the rest position, the two lines being substantially perpendicular.

Naturally, the invention is not limited to the embodiments described with reference to the Figures and variants could be envisaged without departing from the scope of the invention.

The invention claimed is:

1. A flexible guide assembly for a rotating resonator mechanism, the assembly comprising:

a fixed support and two flexible guides extending in substantially the same plane or in two different parallel planes, the two flexible guides being arranged in series, the first flexible guide comprising a first element movable with respect to the fixed support, a first pair of flexible strips connected to the first movable element, such that the first movable element can move by bending the strips of the first pair in a circular motion about a first centre of rotation, the second flexible guide comprising a second element movable with respect to the first movable element and the fixed support, a second pair of flexible strips connecting the second movable element to the first movable element, such that the second movable element can move with respect to the first movable element and the fixed support by bending the strips of the second pair in a circular motion about a second centre of rotation, wherein the first centre of rotation and the second centre of rotation are offset by a first predefined distance belonging to a plane of the assembly, wherein the centres of rotation of the flexible guides are arranged on a straight line in the rest position of the assembly, a centre of mass of the resonator also being arranged on said straight line.

2. The flexible guide assembly according to claim 1, wherein the strips of the first pair of strips are crossed.

3. The flexible guide assembly according to claim 1, wherein the strips of the first pair of strips are not crossed.

4. The flexible guide assembly according to claim 1, wherein the strips of the second pair of strips are crossed.

5. The flexible guide assembly according to claim 1, wherein the strips of the second pair of strips are not crossed.

6. The flexible guide assembly according to claim 1, wherein the assembly comprises a third flexible guide arranged in series downstream of the second flexible guide, the third flexible guide comprising a third movable element and a third pair of flexible strips connecting the third movable element to the second movable element, such that the third movable element can move with respect to the second movable element, the first movable element and the fixed support, by bending the strips of the third pair in a circular motion about a third centre of rotation.

7. The flexible guide assembly according to claim 6, wherein the third centre of rotation is offset with respect to the second centre of rotation by a second predefined distance belonging to a plane of the assembly.

8. The flexible guide assembly according to claim 6, wherein the strips of the third pair of strips are crossed.

9. The flexible guide assembly according to claim 6, wherein the strips of the third pair of strips are not crossed.

10. The flexible guide assembly according to claim 6, wherein the assembly comprises a fourth flexible guide arranged in series, the fourth flexible guide comprising a fourth movable element and a fourth pair of flexible strips connecting the fourth movable element to the third movable element or to the support, such that the fourth movable element can move with respect to the third movable element, the second movable element, the first movable element and the support, by bending the strips of the fourth pair of strips in a circular motion about a fourth centre of rotation.

11. The flexible guide assembly according to claim 10, wherein the fourth centre of rotation is offset with respect to the third centre of rotation by a third predefined distance belonging to a plane of the assembly.

12. The flexible guide assembly according to claim 10, wherein the strips of the fourth pair of strips are crossed.

13. The flexible guide assembly according to claim 10, wherein the strips of the fourth pair of strips are not crossed.

14. The flexible guide assembly according to claim 10, wherein the assembly is symmetrical with respect to a longitudinal line and/or with respect to a transverse line in a rest position of the assembly.

15. The flexible guide assembly according to claim 1, wherein the first pair of flexible strips is connected to the fixed support.

16. The flexible guide assembly according to claim 1, wherein the rigidity of each flexible guide is chosen according to the following equation:

$$\sum_{i=2}^{N+1} r_i\left(1 + k_1\sum_{j=3}^{i}\frac{1}{k_{j-1}}\right)^n = 0$$

for every value of n belonging to the set of values {1, . . . , N−1}, where N is the number of flexible guides, $k_j$ and $k_i$ being the rigidity of guide i and of guide j, and $r_i$ being the offset between the centres of rotation of flexible guide i and of flexible guide i−1.

17. The flexible guide assembly according to claim 1, wherein the flexible guides are identical and follow the following equation:

$$\sum_{i=2}^{N+1} r_i(i-1)^n = 0$$

for every value of n belonging to the set of values {1, . . . , N−1} where N is the number of flexible guides and $r_{N+1}$ is the distance between the last centre of rotation of the last flexible guide and the centre of mass (M).

18. The flexible guide assembly according to claim 1, wherein the flexible guides follow the following equation:

$$\frac{r_{k+1}}{r_1} = (-1)^k\binom{N}{k}$$

where k=0, 1, . . . , N, N being the number of flexible guides and the value of the number k being chosen as a function of the number of pivots and following the rule of Pascal's triangle.

19. A rotating resonator mechanism for a timepiece movement, comprising:

an oscillating weight; and the flexible guide assembly according to claim 1.

* * * * *